United States Patent [19]

Watanabe

[11] Patent Number: 5,436,690
[45] Date of Patent: Jul. 25, 1995

[54] CAMERA SYSTEM

[75] Inventor: Toshimi Watanabe, Machida, Japan

[73] Assignee: Nikon Corporation, Tokyo, Japan

[21] Appl. No.: 166,912

[22] Filed: Dec. 15, 1993

Related U.S. Application Data

[63] Continuation of Ser. No. 990,445, Dec. 15, 1992, abandoned.

[30] Foreign Application Priority Data

Dec. 19, 1991 [JP] Japan ................... 3-335426

[51] Int. Cl.⁶ ............................................. G03B 13/00
[52] U.S. Cl. ..................... 354/402; 354/62; 354/219
[58] Field of Search ............... 354/219, 400, 402, 403, 354/410, 62

[56] References Cited

U.S. PATENT DOCUMENTS

| | | | |
|---|---|---|---|
| 4,574,314 | 3/1986 | Weinblatt | 358/227 |
| 4,836,670 | 6/1989 | Hutchinson | 351/210 |
| 4,950,069 | 8/1990 | Hutchinson | 351/210 |
| 5,036,347 | 7/1991 | Tsunekawa et al. | 354/400 |
| 5,214,466 | 5/1993 | Nagano et al. | 354/402 |

FOREIGN PATENT DOCUMENTS 3-107932  5/1991  Japan .
3-107933  5/1991  Japan .

Primary Examiner—David M. Gray
Attorney, Agent, or Firm—Shapiro and Shapiro

[57] ABSTRACT

A camera with a sight line detecting apparatus is designed such that if watching point information storing means for watching point information is in a saturated state when new watching point information is found, watching point information low in reliability will be preferentially deleted and the new watching point information will be renewed and recorded with a watching time and lapse time being taken into account. Also, to improve reliability, different weighting may be performed on the watching point information depending upon an elapsed time from the time of initially determining the watching point information.

9 Claims, 9 Drawing Sheets

CAMERA SYSTEM

This is a continuation of application Ser. No. 990,445, filed Dec. 15, 1992, now abandoned.

BACKGROUND OF THE INVENTION

1. Field of the Invention

This invention relates to a camera with a sight line detecting apparatus capable of detecting the position of a photographic line of sight.

2. Related Background Art

Japanese Laid-Open Patent Application No. 3-107932 discloses an apparatus for judging a watching position on the basis of a photographer's line of sight, storing a plurality of watching positions within a predetermined time by storing means, and calculating light metering information and range information by those watching positions.

Further, Japanese Laid-Open Patent Application No. 3-107933 discloses an apparatus for changing a weighting factor for each light metering area with a watching time, in addition to a watching position, being taken into account, and calculating light metering information.

In the apparatuses according to the prior art, however, when a range area and a light metering area are controlled by the watching point information within a predetermined time, they have been determined by the relation between the watching position and the length of the watching time without the lapse time of the watching point information being taken into account.

For example, when the oldest watching point information and the newest watching point information are entirely the same watching times, it is judged that the degrees of importance of those two kinds of watching point information are equal to each other. Actually, however, it is often the case that old watching point information in which time has elapsed is low in reliability.

Thus, it seems that in many cases, watching point information low in reliability remains and watching point information which seems to be high in reliability is erased. Accordingly, the information of AF and AE calculated on the basis of watching point information becomes low in reliability. This will prevent a photographer from performing photographing as he intends.

Further, it is conceivable for storing means storing watching point information therein to be saturated, and in that case, consideration must be given to watching point information to be erased when new watching point information is judged.

For example, where the watching time of the oldest watching point information stored in storing means is very long and the watching time of the second oldest watching point information is extremely short, reliability will become low unless which watching time should be preferentially erased is considered.

SUMMARY OF THE INVENTION

The present invention can enhance the accuracy of the detection of a line of sight because it is designed such that if watching point information storing means for watching point information is in a saturated state when new watching point information is found, watching point information low in reliability will be preferentially deleted and the new watching point information will be renewed and recorded with a watching time and lapse time being taken into account.

In accordance with another aspect of the present invention, different weighting may be applied to the watching point information depending upon an elapsed time from the time of initially determining the watching point information, thereby improving reliability.

DETAILED DESCRIPTION OF THE PREFERRED EMBODIMENTS

Figure 1:
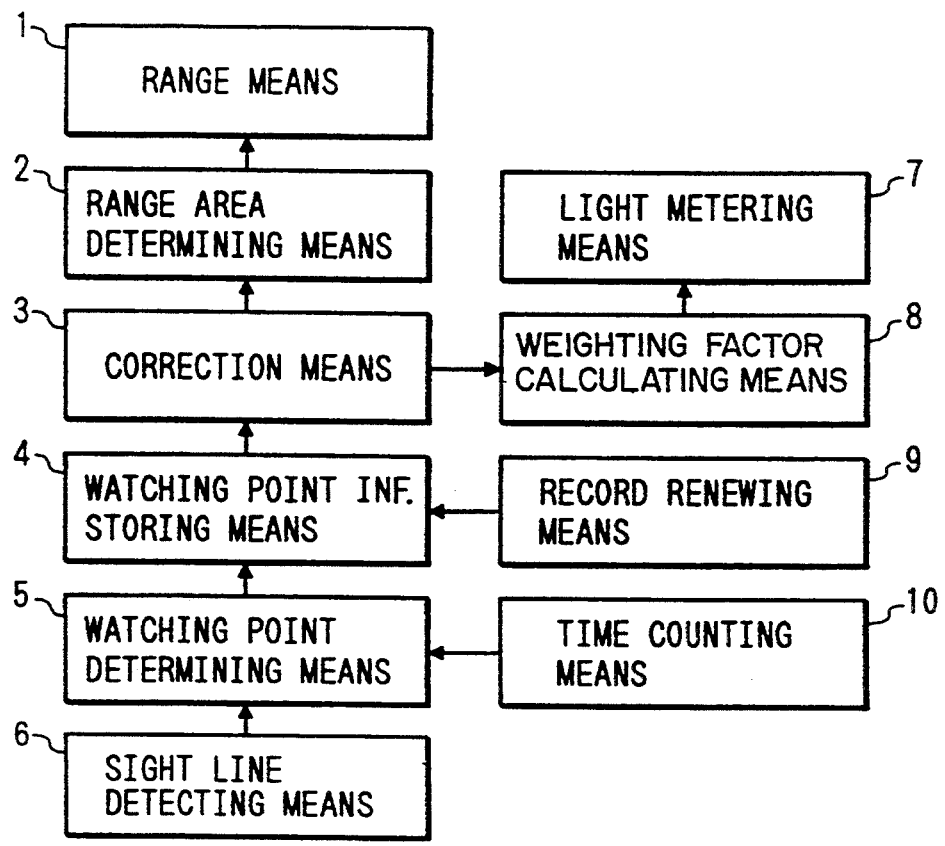
FIG. 1 is a diagram corresponding to the claims of the present invention.
Figure 2:
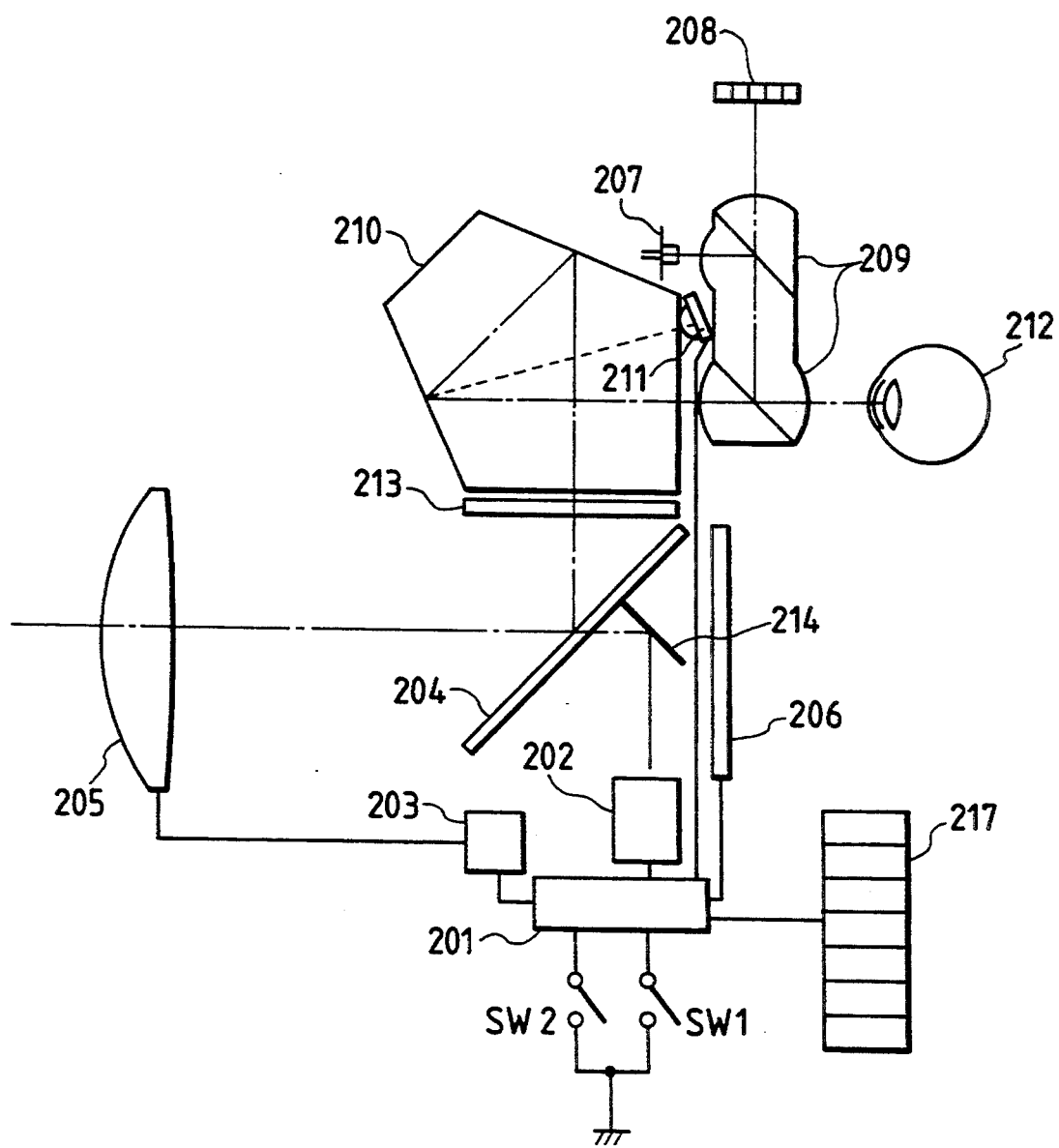
FIG. 2 shows the construction of the present invention.

FIG. 1 is a simple diagram corresponding to the claims of the present invention. FIG. 2 shows the construction of the present invention.

FIG. 2 will hereinafter be described. Object light passed through a photo-taking lens 205 is divided to a finder 210 and an AF circuit 202 by a main mirror 204, and the light of the AF circuit 202 has its optical path further bent by a sub-mirror 214 and is directed to the AF circuit 202. The light directed to the finder 210 by the main mirror 204 forms an object image on a screen 213. The AF circuit 202 is a conventional automatic focus adjusting circuit and has a plurality of focus detection areas, and the photo-taking lens 205 is driven by a lens driving circuit 203 on the basis of the adjusted state of the lens detected in the focus detection areas, An AE circuit 211 is comprised of a photoelectric conversion element divided into a plurality and performs light metering outputting weight-averaged on the basis of the position of a line of sight. A release circuit 206 starts its release operation upon closing of SW2 (hereinafter referred to as the full depression switch). An optical system 209, a light emitting element 207 and a light receiving element 208 together form a circuit for performing conventional sight line detections such as "Purkinje's 1st image+Purkinge's 4th image" and "Purkinje's 1st image+center of pupil". A storing circuit 217 is a circuit for storing therein watching point information calculated by sight line detection. A CPU 201 controls the AF circuit 202, the AE circuit 211, the release circuit 206 and the sight line detecting operation. SW1 is a switch adapted to be closed by a first stroke of a release button (SW1 will hereinafter be referred to as the half depression switch). SW2 is a switch adapted to be closed by a second stroke of the release button (SW2 will hereinafter referred to as the full depression switch).

FIGS. 3, 4, 8, 12, 14 and 15 are flow charts of the control by the program of the CPU 201 of FIG. 2.

Figure 3:
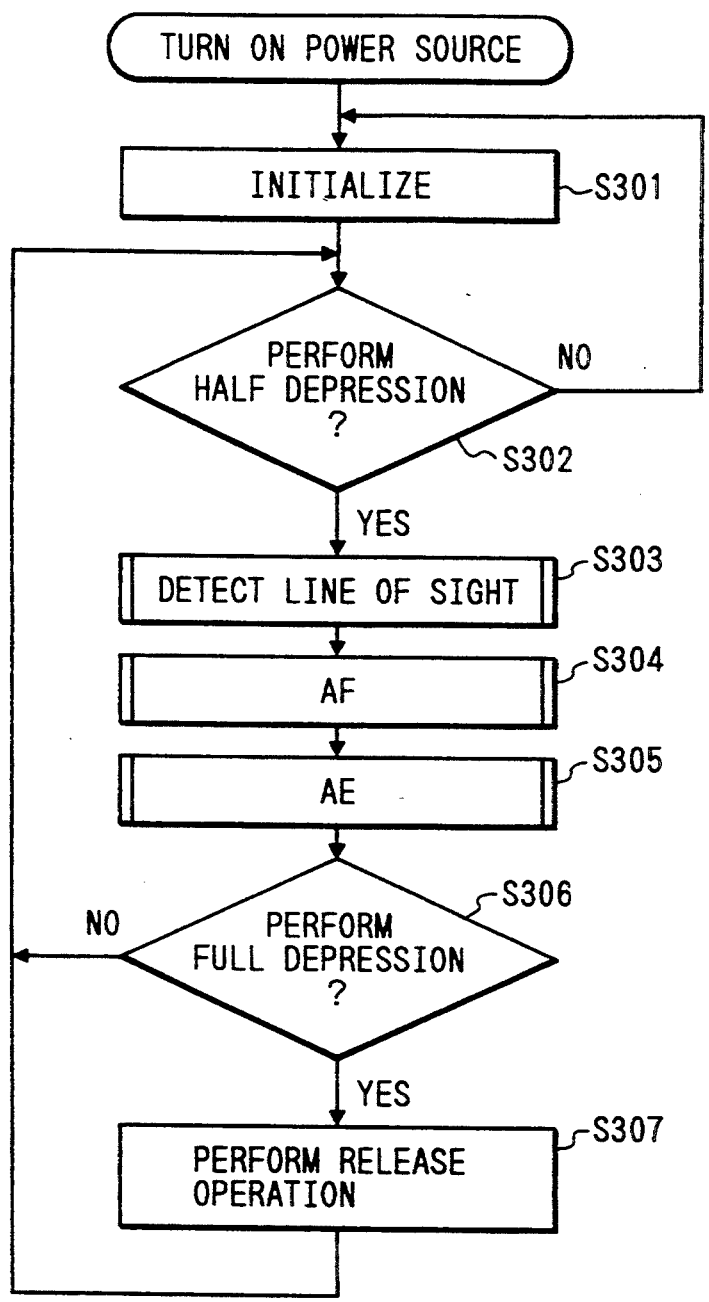
FIG. 3 is a main flow chart of an embodiment of the present invention.

FIG. 3 will hereinafter be described. This flow is started by the turn-on of a power source, not shown.

At S301, variables and flags used in AF, AE, sight line detection, etc., are initialized. At this time, the watching point information stored in the storing circuit is all cleared.

At S302, whether half depression is performed is judged, and if half depression is performed, advance is made to S303, and if half depression is not performed, this judgment is repeated.

Figure 4:
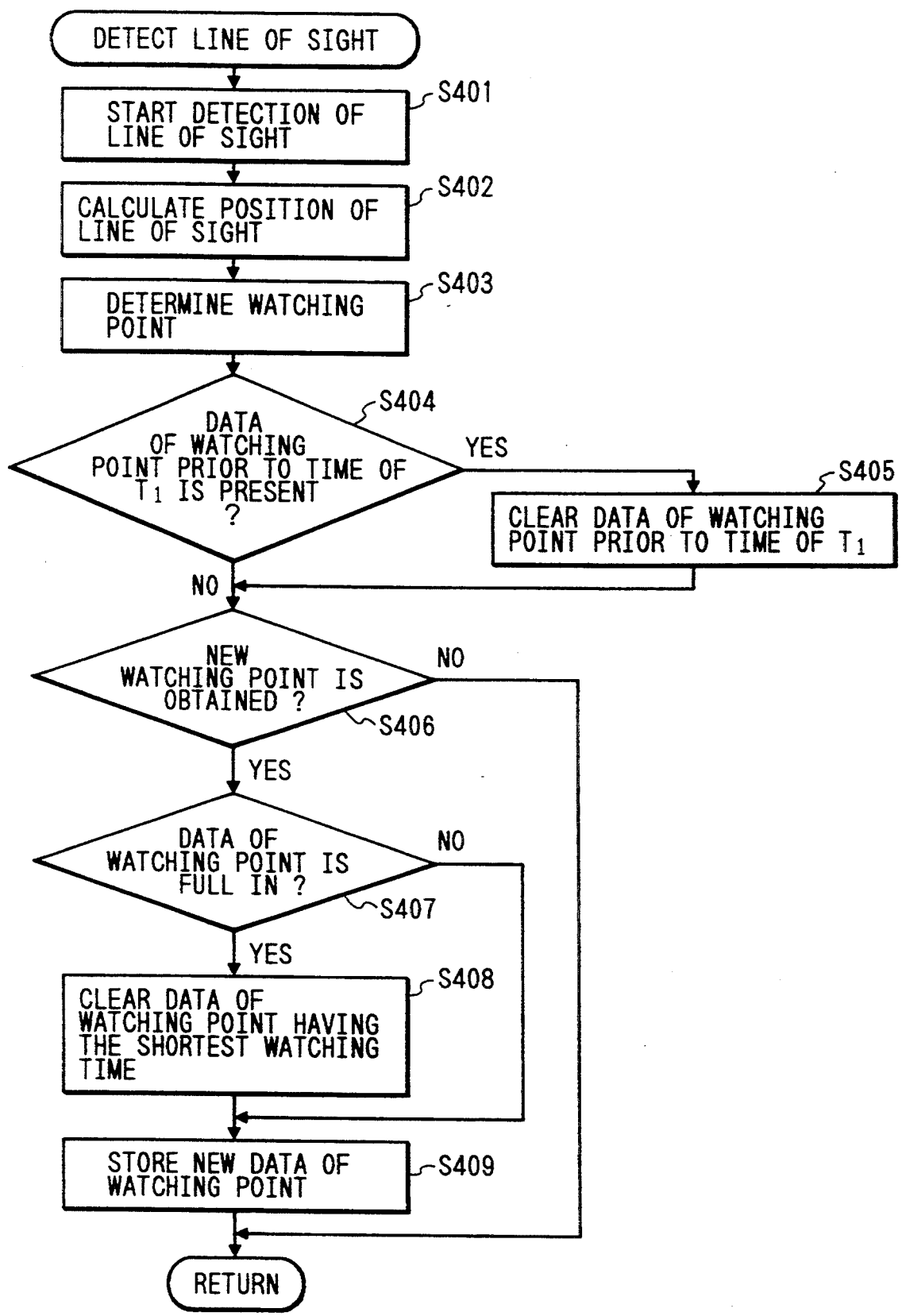
FIG. 4 shows a sight line detection subroutine.

S303 is the subroutine of sight line detection, and the details thereof will hereinafter be described by the use of FIG. 2 on the basis of the flow chart of FIG. 4.

At S401, the detection of a line of sight is started. In the construction of FIG. 2, the light emitting element 207 is an element emitting infrared light, and is designed to emit substantially parallel infrared light that is applied in the optical system 209. The reason why parallel light is applied is to prevent a Purkinje image from being parallel-moved by the parallel movement of an eyeball. The reflected image of the eyeball irradiated with the infrared light is formed on the photoelectric conversion element 208 by the optical system 209. The photoelectric conversion element 208 photoelectrically converts the formed reflected image, which in turn is transferred to and stored in the CPU 201 as image information.

S402 calculates the position of the line of sight on the basis of this image information. This calculating method first calculates the coordinates position of the 1st Purkinje image, and then calculates the coordinates position of Purkinje's 4th image on the center of the pupil. The difference between the coordinates positions of 1st Purkinje image and Purkinje's 4th image or the center of the pupil is proportional to the angle of rotation of the eyeball. Accordingly, by finding the difference, the angle of rotation of the eyeball becomes known, whereby a parallax position is calculated.

S403 determines the position of the watching point. The determination of the position of the watching point is such that when the difference between the last and current positions of the line of sight is equal to or less than a predetermined amount, it is determined as the watching point.

S404 determines whether the watching point information prior to a time of T1 is present, and if the watching point information prior to the time of T1 is present, this watching point information is low in reliability and therefore advance is made to S405, where this watching point information is cleared. If the watching point information prior to the time of T1 is absent, advance is made to S406. The watching point information is comprised of the coordinate position of the watching point, the watching starting time and the watching time. The predetermined time T1 is set so as to be shorter than a maximum time during which the photographer's intention is reflected. Generally, the predetermined value T1 may be about 5 to 10 seconds.

S406 returns the subroutine of parallax detection if a new watching point is not obtained, and if a new watching point is obtained, advance is made to S407.

S407 determines whether the watching point information stored in the storing circuit 217 is full, and if it is full, advance is made to S408, where the watching point information having the shortest watching time is cleared. A watching point having a short watching time is considered to be low in the degree of the photographer's attention and therefore, such information is preferentially cleared and the newest possible information is used.

S408 stores new watching point information into the storing circuit 217. Then it returns the subroutine of the detection of the line of sight.

Figure 5:
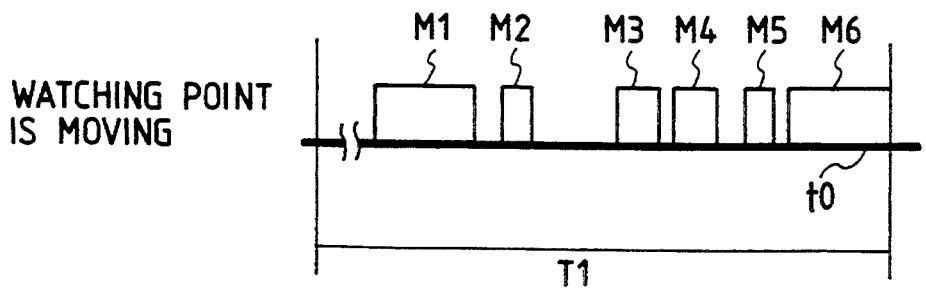
FIG. 5 illustrates the renewal of the recording of watching point information.
Figure 6:
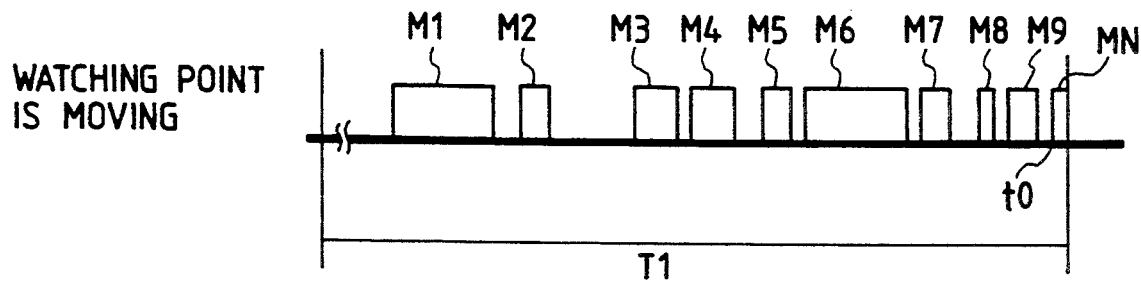
FIG. 6 illustrates the renewal of the recording of watching point information.
Figure 7:
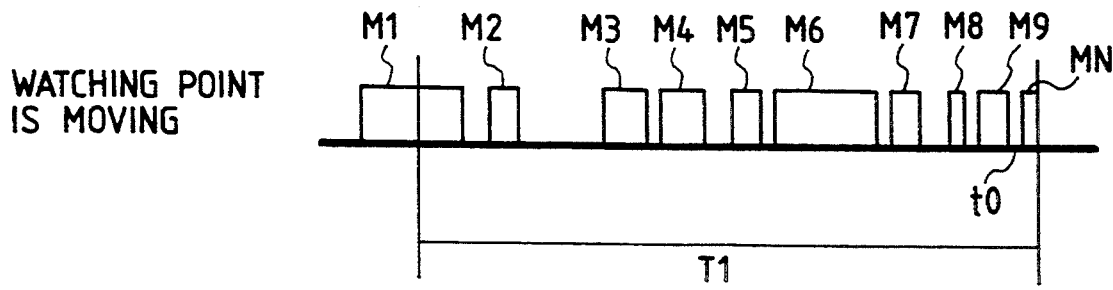
FIG. 7 illustrates the renewal of the recording of watching point information.

The storing operation for the watching point information stored into the storing circuit 217 is shown in FIGS. 5 to 7.

In FIG. 5, M1-M6 designate the watching point information stored in the storing circuit 217, and t0 denotes the current time. The storing circuit 217 can store, for example, maximum nine bits of watching point information therein.

FIG. 6 shows the operation of S408. Where watching point information is already stored up to M1-M9 in the storing circuit 217 and the oldest watching point information is within the time of T1, if new watching point information MN is determined, M8 having the shortest watching time among the watching point information M1-M9 is cleared and instead, MN is stored into M8.

FIG. 7 shows the operation of S405. Here, M1 among the watching point information stored in the storing circuit 217 is prior to the time of T1. In this case, the stored watching point information M1 is cleared.

Figure 8:
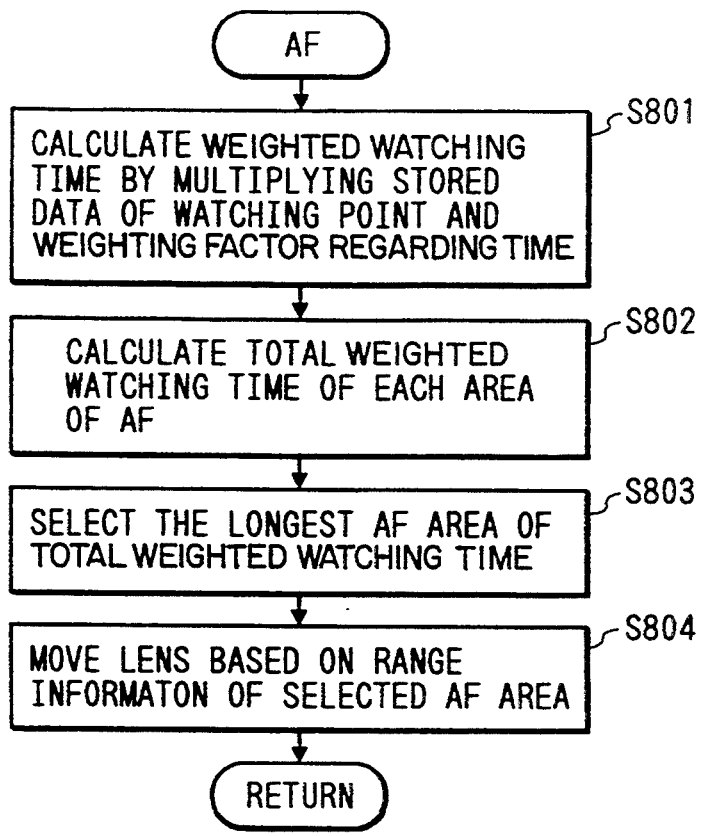
FIG. 8 shows an AF subroutine.
Figure 10:
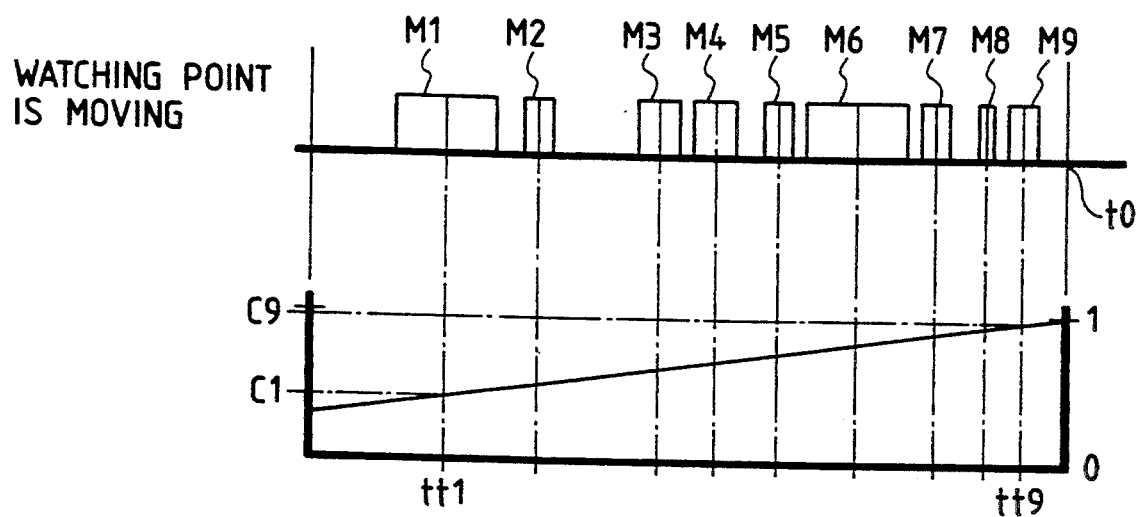
FIG. 10 illustrates the calculation of a weighting factor regarding time.

Subsequently, the AF subroutine of S304 is executed. The AF subroutine is shown in FIG. 8 and will now be described. S801 will be described on the basis of FIG. 10 with regard to a factor Cn to the watching time of the stored watching point information. The weighting factor is a real number from 0 to 1 and assumes a smaller value as it goes back to the past. Here is shown a case where it is a linear function with respect to time. Accordingly, the weighting factor Cn is calculated as follows:

$$Cn = 1 - k \times (t0 - ttn) \quad (1)$$

k: the inclination of the linear function ($>0$)
t0: the current time
ttn: the central time of the watching point information stored in Mn Next, the weighted watching time TPn is found as follows:

$$TPn = Cn \times TTn \quad (2)$$

TTn: the watching time stored in Mn

Figure 11:
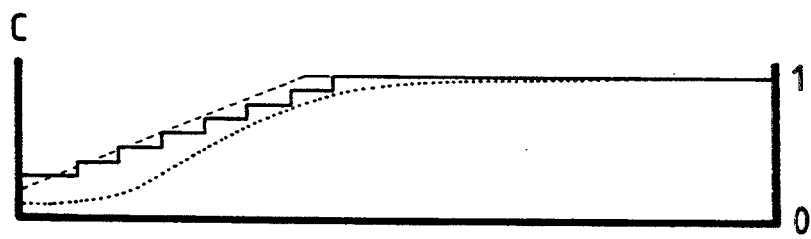
FIG. 11 shows a variation of a function representative of the weighted factor.

Here, the inclination k is a predetermined value which satisfies $1/T1 > k > 0$. Besides the linear function shown here, the weighting factor as shown in FIG. 11 is 1, but the weighting factor Cn to the watching point information older than that is a function which can be approximated by a linear function. A function (b) is a function smoothly linked to a function (a). A function (c) is a function which has been made stepwise so that a continuous function can be easily calculated.

Figure 9:
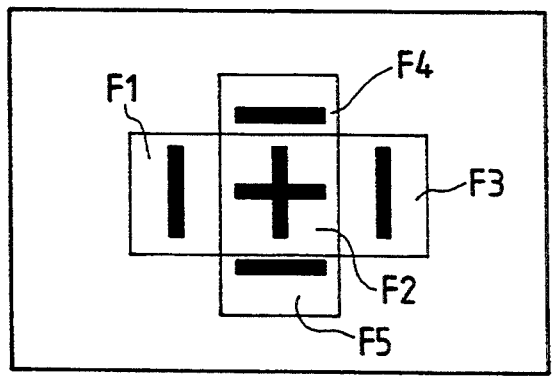
FIG. 9 shows range areas.

S802 calculates the total weighted watching time with respect to each watched area F1-F5 included in the area of AF shown in FIG. 9. In FIG. 9, the range area is divided into five areas F1 to F5. The areas F1 to F5 are areas for determining whether each range area is watched, and for example, when the watching point is in the area F1, it is considered that an object on which the lens is to be focused is in the range area within the area F1.

S803 selects a range area included in the area having the longest total weighted watching time that the location having the longest watching time contains a main object.

S804 drives the lens on the basis of the range information of the selected range area. Then it returns the AF subroutine.

Figure 12:
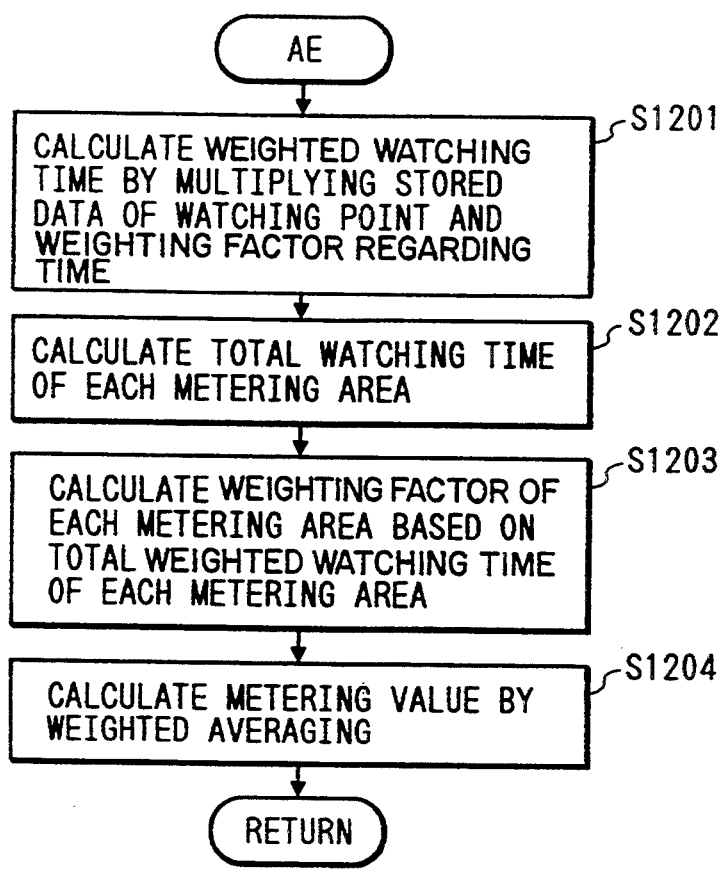
FIG. 12 shows an AE subroutine.
Figure 13:
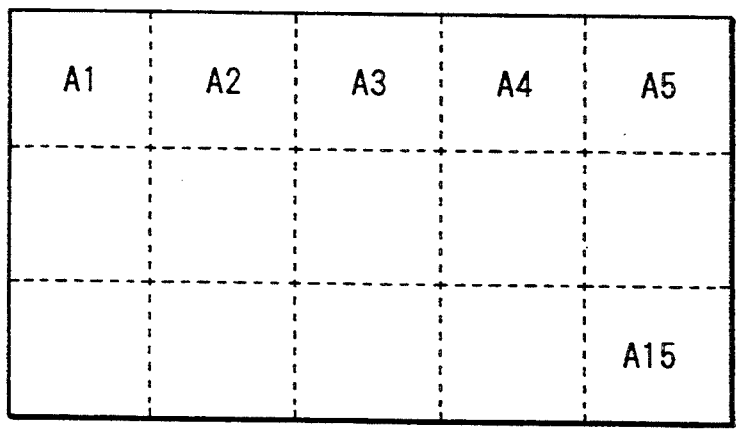
FIG. 13 shows metering areas.

Subsequently the AE subroutine of S305 is executed. The AE subroutine is shown in FIG. 12. FIG. 13 shows divided metering areas of AE. Here, the metering areas are fifteen small blocks. The metering areas A1–A15 are completely coincident with an area for the statistics of the position of the watching point for calculating the weighting factor of each metering area.

S1201 calculates a weighting watching time by multiplying the stored watching point information by a weighting factor regarding time, in a manner similar to S801. S1202 calculates the total weighted watching time of each metering area.

S1203 calculates the weighting factor CAm of each metering area on the basis of the total weighted watching time of each area calculated at S1202. This is as follows:

$$CAm = TTEi/\Sigma TTEi \qquad (3)$$

m: the numbers of the metering areas (1–15)
TTEi: the total weighted watching time of the ith metering area S1204 calculates a metering value weighted-averaged by the weighted factor CAm of each metering area calculated at S1203. This is as follows:

$$EV = \Sigma(CAm \times EVm) \qquad (4)$$

EV: the metering value for controlling the exposure of the camera
EVm: the metering value of the metering area Am The metering value EV is calculated, and this AE subroutine is ended.

Subsequently, at S306, whether full depression has been performed is judged, and if full depression has not been performed, advance is made to S302, whereafter this loop is repeated. If full depression has been performed, advance is made to S307, where the release operation is performed, and when photographing is terminated, advance is made to S302.

In this embodiment, each metering area and the area for calculating the weighting factor for light metering are of the same size, but alternatively, the area for calculating the weighting factor may be made larger than each metering area and adjusted areas may be secured so as to overlap each other a little. This is because the human eyeball vibrates about the vicinity of the watching point by fine fixation movement or the like and therefore if the areas are neatly partitioned, the weighting factor will be greatly changed by the slight movement of the line of sight when the vicinity of the boundary between the areas is being watched.

A second embodiment will now be described. The second embodiment differs only in the AE subroutine from the first embodiment and therefore, the other portions thereof need not be described.

Figure 14:
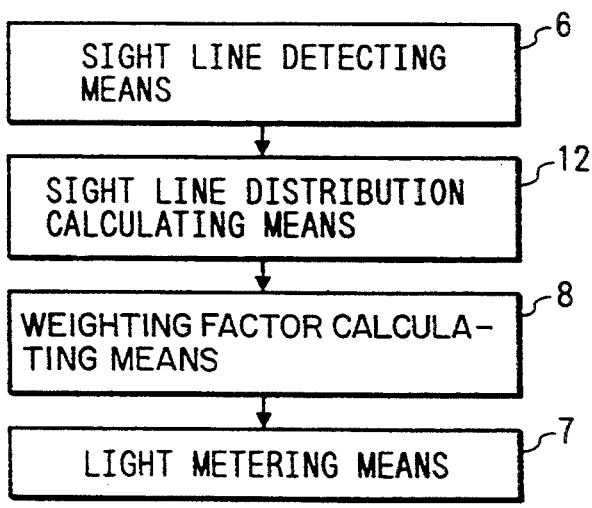
FIG. 14 shows the construction of a second embodiment.

The construction diagram of FIG. 14 will first be described. The distribution of the line of sight in a predetermined number or a predetermined time is calculated by sight line distribution calculating means, predetermined weighting is effected on the last distribution of the line of sight and the current distribution of the line of sight to thereby average them, and a new distribution of the line of sight is calculated. Subsequently, the weighting calculation of the metering area is effected by the use of the calculated distribution of the line of sight. That is, in the first embodiment, the weighting factor of the metering area is calculated by the use of the point being watched, whereas in this embodiment, whether the photographer is watching is not judged, but the weighting factor is calculated with regard to in what area the line of sight has moved.

Figure 15:
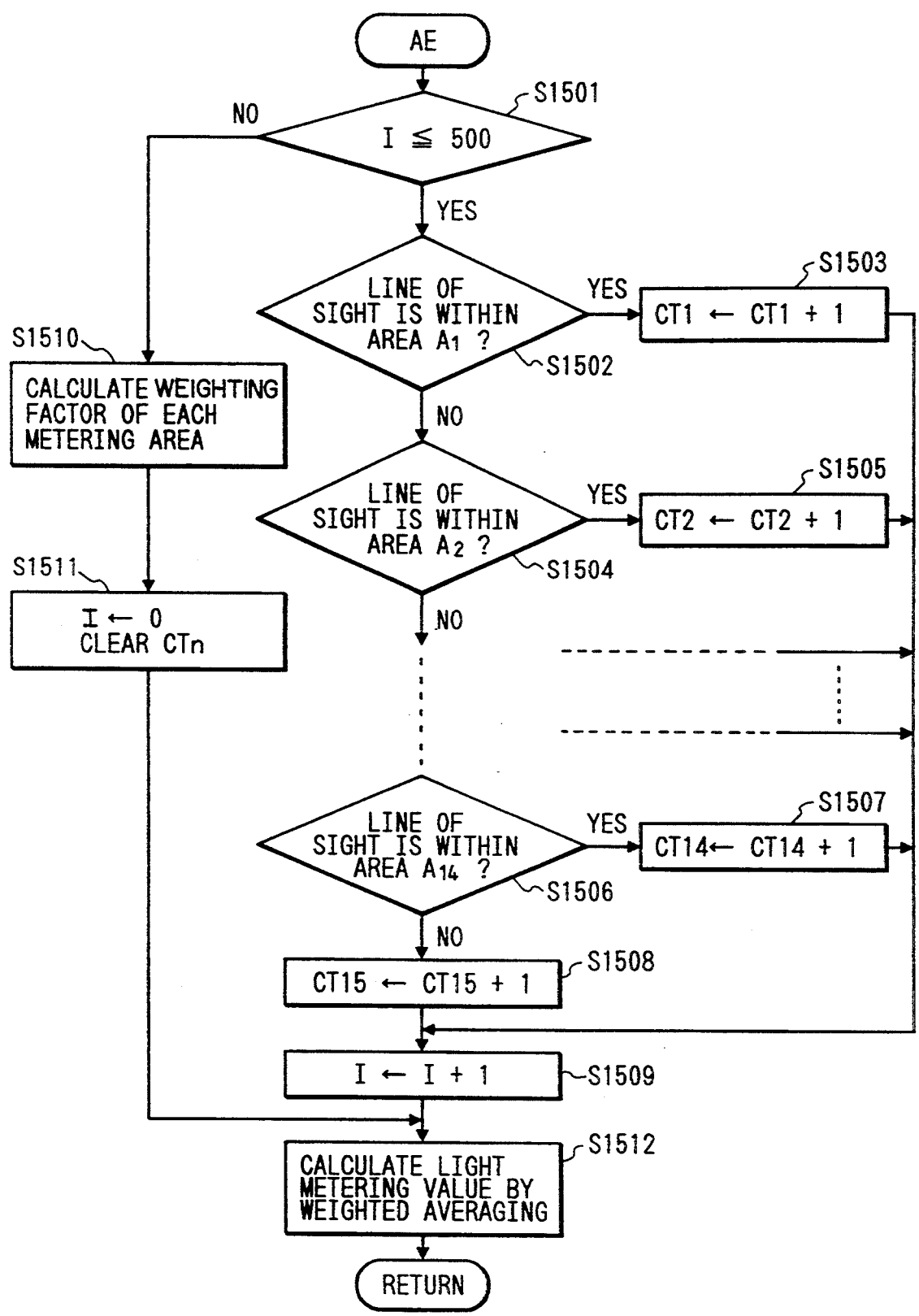
FIG. 15 shows an AE subroutine in the second embodiment.

Description will now be made with reference to FIG. 15. S1501 judges whether 500 bits of information of the position of the line of sight have gathered, and if the number of the bits of information is less than 500, advance is made to S1502, and if 500 bits of information have gathered, advance is made to S1510. This is for calculating the weighting factor on the basis of 500 bits of information of the position of the line of sight by the distribution thereof.

S1502 judges whether the line of sight is within a metering area A1, and if it is within this area, advance is made to S1503, where a counter CT1 for counting the frequency with which the line of sight has been within an area A1 is incremented by 1. More generally, whether the line of sight is within an area An (n=1–15) is judged, and if the line of sight is within An, a counter CTn is incremented by 1 (S1502–S1508). When one of the counters CTn is incremented by 1, advance is made to S1509, where a counter I for indicating the number of the bits of information of the line of sight is incremented by 1.

Once 500 bits of information of the line of sight have been gathered, S1510 calculates the weighting factor of each metering area on the basis of these 500 bits of information. The equation for calculating the weighting factor CAm of each metering area is as follows:

$$CAm = CTm/500 \qquad (5)$$

m: the numbers of the areas (1–15)
Further, in order to add weighting regarding time, correction is made as follows:

$$CAm = k1 \times CAm' + k2 \times CAm \qquad (6)$$

k1, k2: the weighting factors regarding time (k1+k2=1)
CAm': the weighting factor of the last metering area
Here, CAm in the right side of equation (6) is the weighting factor calculated by equation (5). The factors k1 and k2 are weighting factors regarding time, and the greater k1 becomes as compared with k2, the greater becomes the weighting to the past.

S1511 clears the counter I for counting the number of the bits of information of the line of right to 0, and clears the counters CTn for counting the number of the bits of information which have been in the areas An.

S1512 calculates the metering value by weighted averaging in accordance with the aforementioned equation (4).

When the newest watching point information has been determined, watching point information low in reliability and having a short watching time is preferentially erased, and by the lapse time from a predetermined time till the time when said plurality of bits of watching point information have been judged as the watching point, different weighting is effected so that old watching point information low in reliability may become small and new watching point information high in reliability may become great, whereby the reliability of watching point information is enhanced and the reliability of AF and AE information calculated by the watching point information is also enhanced, and photographing as it is intended by the photographer becomes possible.

What is claimed is:

1. A camera with a sight line detecting apparatus comprising:

sight line detecting means for detecting a photographer's line of sight;

time counting means for counting time;

watching point determining means for judging a watching point based on outputs of said sight line detecting means and said time counting means;

watching point information storing means for storing therein a plurality of bits of watching point information time-serially calculated by said watching point determining means; and record renewing means for recording and renewing said plurality of bits of watching point information in said watching point information storing means;

said record renewing means preferentially erasing the watching point information having a shortest watching time and recording a newest watching point information when the newest watching point information is calculated and when said watching point information storing means is saturated.

2. A camera with a sight line detecting apparatus according to claim 1, wherein said watching point determining means is designed to calculate watching point information based on a time when watching has been started, a watching time and a watching position.

3. A camera with a sight line detecting apparatus according to claim 1, further comprising range means capable of measuring a range in each of a plurality of range areas, and range area selecting means for selecting one of said plurality of range areas of said range means based on said plurality of bits of watching point information.

4. A camera with a sight line detecting apparatus according to claim 2, further comprising range means capable of measuring a range in each of a plurality of range areas, and range area selecting means for selecting one of said plurality of range areas of said range based on said plurality of bits of watching point information.

5. A camera with a sight line detecting apparatus comprising:

sight line detecting means for detecting a photographer's line of sight;

time counting means for counting time;

watching point determining means for judging a watching point based on outputs of said sight line detecting means and said time counting means;

watching point information storing means for storing therein a plurality of bits of watching point information time-serially calculated by said watching point determining means;

watching point information renewing means for recording and renewing said plurality of bits of watching point information in said watching point information storing means; and correcting means for correcting said plurality of bits of watching point information stored in said watching point information storing means;

said correcting means calculating weighted watching point information by weighting said plurality of bits of watching point information stored in said watching point information storing means differently depending upon an elapsed time from the time when said plurality of bits are judged to be a watching point.

6. A camera with a sight line detecting apparatus according to claim 5, further comprising range means capable of measuring a range in each of a plurality of range areas, and range area selecting means for selecting one of said plurality of range areas of said range means based on said weighed watching point information.

7. A camera with a sight line detecting apparatus according to claim 5, further comprising light metering means capable of effecting light metering in each of a plurality of light metering areas, and light metering value calculating means for calculating a final light metering value in each of said light metering areas based on a metering output of said light metering means and a weighting factor.

8. A camera with a sight line detecting apparatus for detecting a photographer's line of sight, wherein, when new watching point information is produced by outputs of a time counting circuit for counting time and said sight line detecting apparatus, and a memory element capable of storing a plurality of watching point information is saturated and can not store said new watching point information, a watching point information having a shortest watching time of watching point information already stored in said memory element is erased and said new watching point information is stored.

9. A camera with a sight line detecting apparatus for detecting a photographer's line of sight, and which is provided with a time counting circuit for counting time and a memory element storing a plurality of watching point information produced by said time counting circuit and said sight line detecting apparatus, wherein the plurality of watching point information stored in said memory element is weighted differently according to an elapse of time from the time when said plurality of watching point information are judged to be a watching point.

* * * * *